Figure 1:
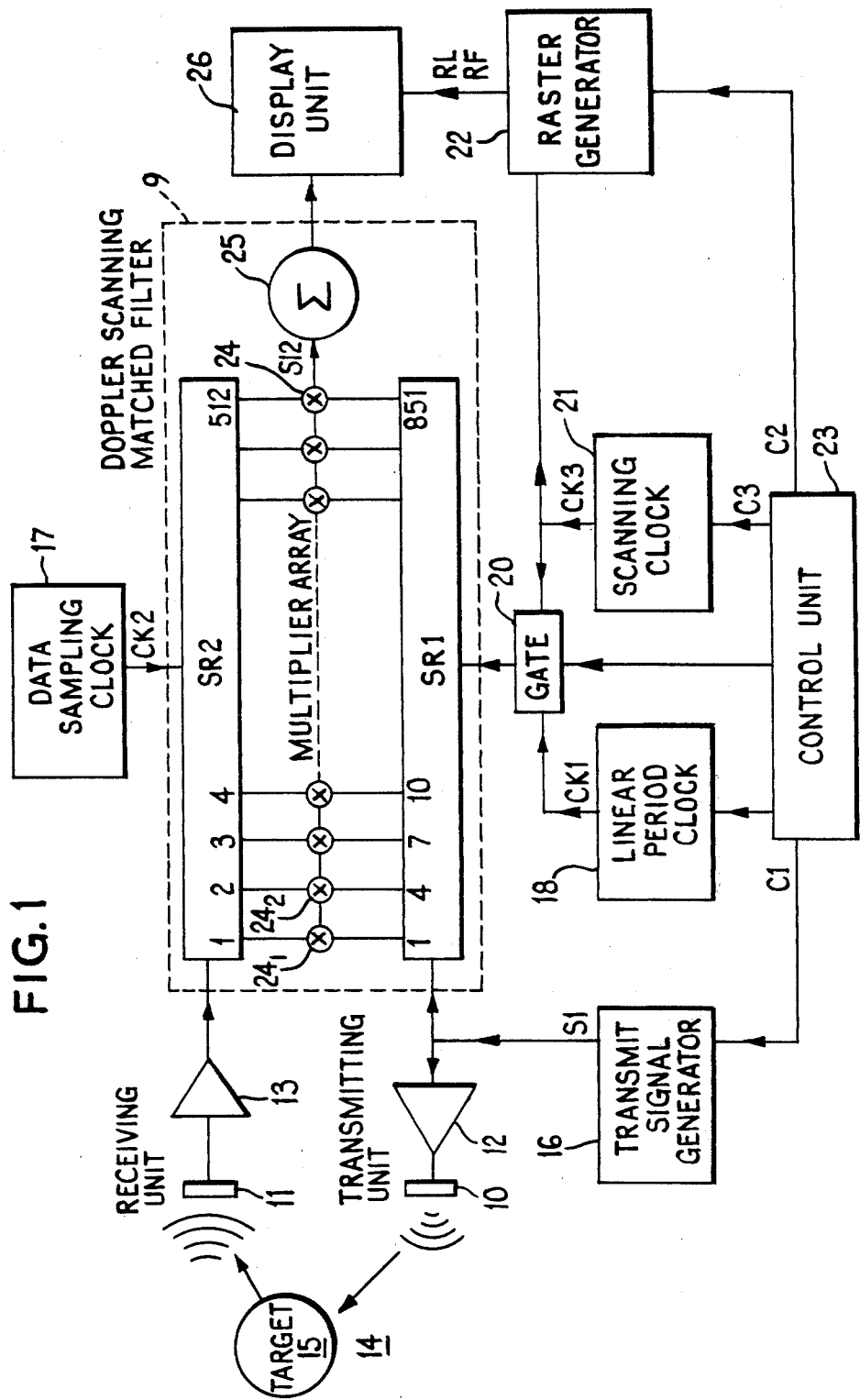

United States Patent [19]

Chotiros

[11] 4,398,274
[45] Aug. 9, 1983

[54] WITHIN-PULSE DOPPLER SCANNING

[75] Inventor: Pornchai Chotiros, Birmingham, England

[73] Assignee: The Secretary of State for Defence in Her Britannic Majesty's Government of the United Kingdom of Great Britain and Northern Ireland, London, England

[21] Appl. No.: 232,220

[22] Filed: Feb. 6, 1981

[30] Foreign Application Priority Data

Feb. 8, 1980 [GB] United Kingdom ............... 8004260

[51] Int. Cl.³ .............................................. G01S 15/58
[52] U.S. Cl. ......................................... 367/90; 343/8;
364/728; 364/824; 364/862; 367/100
[58] Field of Search ................................. 367/90, 100;
343/100 CL, 8, 9 R; 364/728, 824, 862

[56] References Cited

U.S. PATENT DOCUMENTS 3,696,414 10/1972 Allen et al. ...................... 367/100 X
3,798,590 3/1974 Jacobson et al. ..................... 367/90
3,997,973 12/1976 Buss ................................. 364/862 X
4,255,795 3/1981 Hechtenberg ........................ 364/728

FOREIGN PATENT DOCUMENTS 642713 1/1979 U.S.S.R. ............................. 367/100

Primary Examiner—Richard A. Farley
Attorney, Agent, or Firm—Cushman, Darby & Cushman

[57] ABSTRACT

The invention concerns a method and apparatus for detecting Doppler-shifted waveforms in electrical signals. A replica is derived from the waveform prior to Doppler shift and stored in a storage device as a non-uniform profile having progressively increasing distortion along its length. The replica storage device is connected non-uniformly to correlating means such that the correlated replica profile has a degree of uniform distortion varying with storage position simulating varying degrees of Doppler shift. The electrical signal is uniformly correlated with the replica while the replica storage position is varied. An output signal is generated indicating correlation variation. The electrical signal is repetitively sampled and a maximum correlation is detected when the waveform occurs in the electrical signal with a degree of Doppler shift matching that simulated by the correlated replica. The invention also includes apparatus for performing the method.

19 Claims, 9 Drawing Figures

CORRELATOR OUTPUT
V-CHIRP PULSE WAVEFORM

1 TARGET AT A RANGE OF 4 METRES, ZERO VELOCITY

CORRELATOR OUTPUT
RANDOM (HOPPING) PULSE WAVEFORM

- 1 TARGET AT A RANGE OF 4 METRES, ZERO VELOCITY

WITHIN-PULSE DOPPLER SCANNING

This invention relates to the detection of waveforms in electrical signals, including those signals derived by transducer means from electromagnetic waves and acoustic stress waves. In particular the invention relates to signal detection of the kind in which an electrical signal is compared with a replica or reference signal.

The invention is particularly applicable to pulse-echo techniques such as sonar and radar. In these techniques a train of pulses of acoustic or electromagnetic energy is transmitted into a field of view and is reflected to a receiver from objects encountered. The functions of transmitter and receiver may be common to a single transducer. The transducer both generates the transmitted waveform as a pulse-modulated output in response to electrical exitation and generates a received electrical signal containing the waveform of the reflected pulses. In practice, the output of the transducer contains noise in addition to the waveforms or pulses to be detected, and this increases the difficulty of detection. To improve detection capability, the transmitted pulse may be frequency modulated, and the received signal may be electronically correlated with a reference signal in the form of a replica of the transmitted signal. Correlation techniques involve comparing the profiles of the replica and received signals. This is commonly implemented by storing the replica pulse profile as a series of uniformly time-sampled or sequential values, obtaining a similar series of sequential values of the received electrical signal, and multiplying each replica value by the corresponding received signal value. The correlator output $C_{out}$ is obtaining by summing the results of the multiplication operations to yield:

$$C_{out} = \sum_{n=1}^{N} T_n R_n$$

where $T_n$ and $R_n$ are the nth values of the transmitted or replica signal and the electrical signal respectively. This output is a maximum when the replica and electrical signal profiles match exactly, which occurs when the electrical signal contains the waveform to be detected. The electrical signal is sampled to provide successive sets or series of values until the match is achieved.

The correlation technique appreciably improves the signal-to-noise performance of this kind of detection system, but the sensitivity is reduced if the waveform to be detected is distorted by a Doppler shift. The effect of a Doppler shift on a pulse-modulated signal is to contract or expand the time duration of each pulse in addition to shifting the pulse frequency or frequency spectrum. This reduces the maximum degree of correlation obtainable, since the time duration and profile of the Doppler-shifted received pulse differ from those of the replica.

To overcome the problem of detecting Doppler-shifted waveforms, it is known to employ a stored series of replicas of the waveform having varying degrees of time duration distortion (profile contraction or expansion) simulating varying degrees of Doppler shift. The received signal is correlated with each replica in turn until the best degree of match is achieved. However, for complex waveforms and frequency modulated signals in particular, effective correlation requires a large number of replica signals with correspondingly large storage facilities. A dedicated main-frame computer would be required in sonar applications for example. Furthermore, the correlation operation would be undesirably slow because of the need to read in and compare each replica in turn.

It is an object of the invention to provide a technique for improving the signal-to-noise performance of correlation detection systems.

According to one aspect of the invention, a method of detecting a Doppler-shifted waveform in an electrical signal includes the steps of:

(a) storing the electrical signal and a single replica signal derived from the waveform prior to Doppler shift, (b) correlating one of the signals with a profile of the other signal varying cyclically and uniformly in length distortion, and (c) indicating degree of correlation obtained during step (b).

Where the electrical signal changes with time, such as for example a continuous electrical signal from a sonar transducer, the electrical signal is preferably periodically sampled and steps (a) to (c) above are performed for each sample. A maximum degree of correlation is achieved when the waveform to be detected is present in the stored electrical signal, and the variation of the profile length distortion sweeps through a position at which the replica and waveform have matching correlated profiles.

The invention preferably includes the additional step of determining the Doppler shift from the degree of contraction or expansion of the correlated profile length at which the correlation output is a maximum.

Conveniently, the correlated profile length of the replica signal is cyclically varied to simulate Doppler shift and produce a correlation match with the waveform. Alternatively, the electrical signal itself may be operated upon to compensate for Doppler shift in the waveform for correlation with an undistorted replica.

In a preferred embodiment of the invention the electrical signal and the replica are sampled repetitively into respective storage means in the form of delay lines. The replica signal is sampled at intervals which progressively reduce to impose a progressively increasing distortion on the replica profile, and this continues until the whole replica profile is stored on the replica delay line. The received electrical signal is sampled at a constant rate into its respective delay line. Both delay lines conveniently consist of discrete series-connected elements such as charge-coupled devices, and operate in a "bucket-brigade" mode in which an incoming sample moves all stored samples one line element further along the line. Delay between successive line elements is accordingly controlled by the sampling interval, and is uniform for the electrical signal delay line but non-uniform for the replica line. For the purposes of correlation, uniformly-spaced elements on the received signal delay line are connected via respective multipliers to points on the replica line having progressively reducing spacing. The non-uniformity of connection to the replica delay line, giving non-uniform correlation, is arranged to compensate for the non-uniform replica sampling rate when the replica profile is correlated. The net effect is that multiplication is performed against a correlated replica profile which is uniformly distorted, i.e. contracted or expanded, according to its position on the replica delay line. Scanning the position of the replica on its delay line cyclically varies the correlated replica profile length in a uniform manner simulating Doppler shift, and produces a maximum correlation output when the correlated replica profile matches the Doppler-shifted waveform present in the electrical signal. The received signal is sampled into and moves along its delay line until this occurs. A similar effect may be achieved if the replica sampling intervals progressively increase and the spacing of multiplier connection points progressively increases along the replica delay line, and the operation of profile variation may alternatively although less conveniently be performed on the electrical signal rather than on the replica. Degree and sign of Doppler shift are determinable from the relative positions of the stored profiles at a correlation match compared with those corresponding to zero Doppler shift.

To obtain a uniformly correlated replica, it is preferred that the time intervals between replica samples change in accordance with a geometrical progression, and that the multiplier-connected or correlated elements of the replica delay line are correspondingly spaced in accordance with a like geometric progression. For a delay line composed of discrete elements, the multipliers are connected to those elements separated by intervals changing in a manner most nearly corresponding to a geometric progression.

The delay lines may be of digital or analogue form, and in the former case the samples of the electrical signal and the replica are subjected to analogue to digital conversion before being fed to the delay lines.

To minimise the effect of phase shift between the replica and the received signal, the electrical signal may be correlated with two replica signals having a relative phase difference, conveniently 90°.

According to a further aspect of the invention, an apparatus for detecting a Doppler-shifted waveform in an electrical signal includes:

(a) means for generating a replica signal derived from the waveform prior to Doppler shift, (b) means for storing the electrical and replica signals arranged to introduce progressively increasing distortion along one stored signal, (c) scanning means for cyclically varying the storage position of the distorted signal, and (d) correlating means arranged to indicate degree of correlation between profiles of the stored signals having varying degrees of uniform relative distortion introduced therebetween.

The apparatus preferably also includes means for performing additional features of the method of the invention as hereinbefore broadly set out. In particular, for continuously varying electrical signals the apparatus preferably includes means for repetitively sampling the electrical signal, the scanning means being arranged to operate in the interval between samples.

The apparatus may also advantageously include means for determining the storage position of the scanning signal at maximum correlation compared to that corresponding to zero Doppler shift in order to determine the degree of Doppler shift in the waveform. Conveniently the scanning means operates on the replica, which is stored with progressively increasing distortion.

The replica may be generated by sampling means from a pulse-modulated waveform, and stored on a delay line of series-connected elements. Progressively increasing replica distortion may be introduced by a clock activating both sampling and movement of the samples along the delay line at intervals varying in accordance with a geometric progression. Further sampling means activated at constant intervals is employed to store the electrical signal uniformly on a second similar delay line. Each delay line is longer than its respective signal to be stored, i.e. the replica or the waveform to be detected.

Correlating means may be provided by multipliers connected to uniformly spaced elements along the electrical signal delay line and to elements spaced along the replica delay line in accordance with a geometrical progression. This effects correlation against a replica having a profile which is uniformly distorted relative to that of the electrical signal.

To minimise the effect of phase shift between the waveform and the replica, storing means may be provided for storing two replica signals which are mutually out of phase, preferably by 90°. Correlating means are then provided for correlating the electrical signal with both stored replicas separately.

Figure 2:
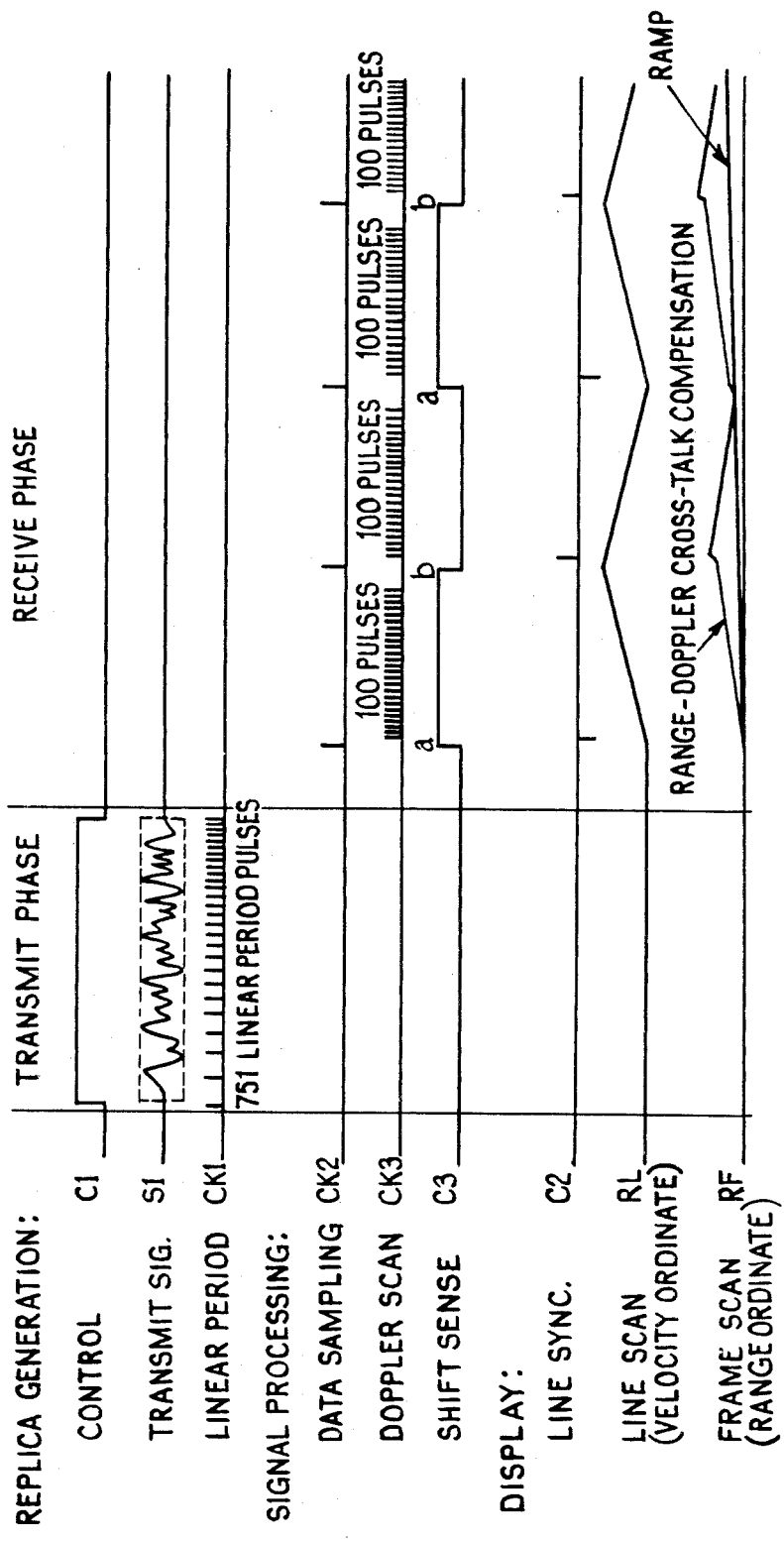
Figure 3:
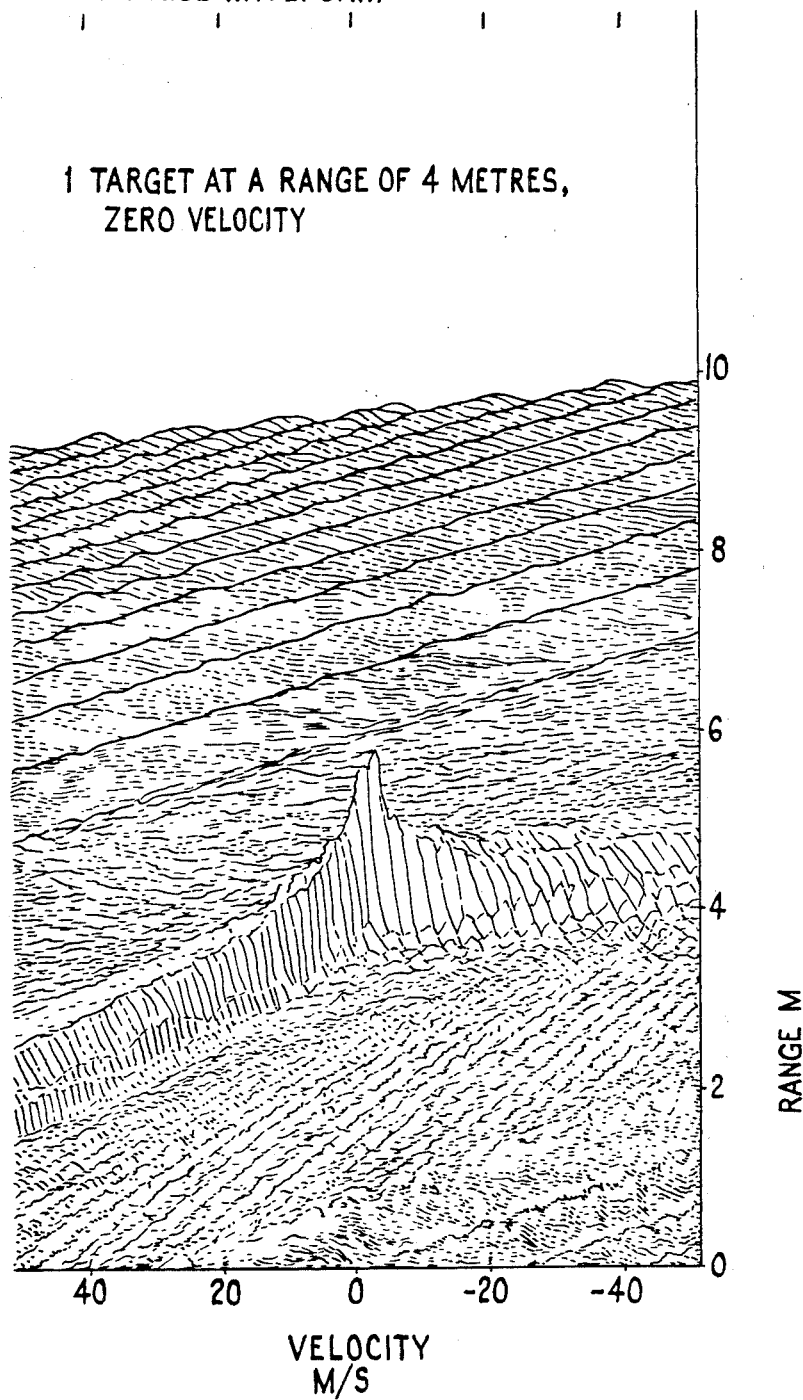
Figure 4:
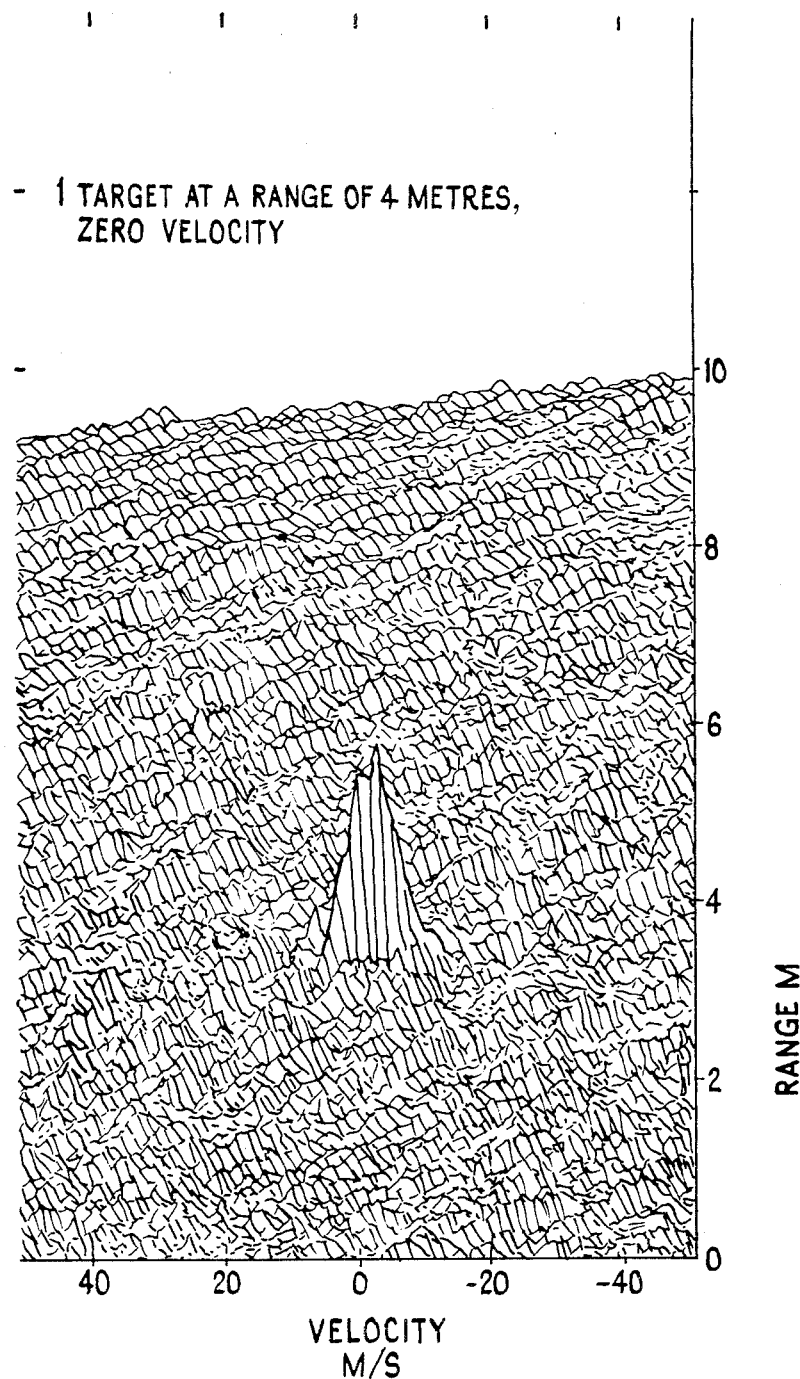

The invention will now be described, by way of example only, with reference to the accompanying drawings in which:

FIG. 1 is a schematic block diagram of a sonar apparatus adapted in accordance with and for performing the method of the invention, FIG. 2 illustrates graphically the operation of the invention, FIGS. 3 and 4 show computer simulations of correlation outputs obtainable by means of the invention, and FIGS. 5 to 9 are further schematic block diagrams of apparatus in accordance with and for carrying out the invention.

Referring to FIG. 1, the apparatus comprises separate transducers 10 and 11 acting respectively as transmitter and receiver for sonar pulses. The transmitter 10 is fed with a sonar pulse waveform by a power amplifier 12, and the output of the receiver 11 is fed to a second power amplifier 13. The acoustic output of the sonar transmitter 10 is emitted into a field of view 14 and reflected from a target 15 to the receiver 11. The output of the receiver 11 is an electrical signal containing noise together with the response of the receiver to the reflected acoustic waveform.

The sonar waveform is produced by a signal generator 16, and consists of a train of pulses which may be of constant frequency or frequency modulated.

The waveform of a single sonar pulse is fed to a storage device SR1, and the electrical signal from the receiver 11 is fed via the power amplifier 13 to a second storage device SR2. The storage devices SR1 and SR2 are in the form of discrete series-connected elements made up of charge-coupled devices (CCDs). SR1 contains 851 such elements and SR2 has 512, the elements being indicated by the numbers 1 to 851 along SR1 and 1 to 512 along SR2. The electrical signal from the receiver 11 is sampled at uniform intervals into the storage device SR1 by means of a data sampling clock 17. The sonar pulse waveform is sampled at progressively reducing intervals by a clock 18, the sampling intervals varying in accordance with a geometric progression so that the ratio of successive intervals is constant. The clock 18 is referred to as a linear period clock, since it can be shown that a geometric progression of time intervals results in the $(n+1)$th sampling time being a linear function of the nth interval between samples.

The clock 18 operates on the storage device SR1 through a gate 20 which is also connected to a scanning clock 21 and raster generator 22. The signal generator 16, gate 20, raster generator 22 and clocks 18 and 21 are connected to a control unit 23.

The storage devices SR1 and SR2 are connected to correlating means in the form of a multiplier array 24 and summing amplifier 25. The elements 1 to 512 of SR2 are each connected to respective multipliers $24_1$ to $24_{512}$ of the array 24 in a uniform manner, the nth element being connected to the nth multiplier for all n from 1 to 512. The array 24 is however connected non-uniformly to the storage device SR1. The spacing between array-connected elements of SR1 varies along SR1 in accordance with a decreasing geometric progression, connected elements near element 1 being triply spaced whereas those near element 851 are singly spaced. In view of the discrete element construction of SR1 it is not possible to achieve exact correspondence with a geometric progression, but the connected elements are selected to achieve this as nearly as possible as set out in Table 1.

The summing amplifier 25 sums the outputs of the multipliers of the array 24, and provides an output signal to a display unit 26 supplied with a raster signal by the raster generator 22. The storage devices SR1 and SR2, the multiplier array 20 and the summing amplifier 25 may be referred to collectively as a Doppler-scanning matched filter or unit 9 enclosed in chain lines.

The arrangement of FIG. 1 operates as follows. Referring to FIG. 2, the control unit 23 delivers a control signal C1 activating the signal generator 16 to produce a randomly frequency-modulated (hopping) sonar pulse waveform S1. The signal C1 also activates the gate 20 and the linear period clock 18 to sample the waveform S1 into the storage device SR1 at intervals reducing in accordance with a geometric progression corresponding to a progressively increasing sampling rate. This is indicated by the sampling signal CK1. As each waveform sample is taken and stored in SR1, it moves the preceding sample one element along SR1 in a "bucket-brigade" manner. This continues until the whole of the sonar pulse waveform is stored as a replica profile which is progressively increasing in distortion with respect to distance along SR1 relative to the waveform. The distortion occurs since the non-uniformity of sampling at progressively reducing intervals produces relative to the waveform a replica profile which progressively contracts from element 1 onwards along SR1. The sampling intervals are chosen so that the replica fills 751 elements of SR1. SR1 acts as a non-uniform delay line in which a progressively reducing delay is imposed by the clock 18 between stored replica samples.

The electrical signal from the receiver 11 is processed as follows. The data sampling clock 17 generates a signal CK2 at uniform intervals to activate SR2 to sample instantaneous values of the electrical signal. As each sample of the electrical signal is taken, the preceding sample is moved one element along SR2. In this way the electrical signal profile is arranged to fill SR2 uniformly and is periodically updated. SR2 acts as a uniform delay line since the clock 17 imposes a uniform delay between elements of SR2.

Between each sample of the electrical signal, the control unit activates the gate 20 and the scanning clock 21 to shift the replica in SR1 in accordance with the shift sense C3. At a of C3 the replica occupies SR1 elements 1 to 751, and at b it occupies elements 101 to 851, so that the replica position is scanned through 100 elements along SR1 between samples of the electrical signal. A scan in one direction is succeeded by a scan in the reverse direction, the scanning clock 21 being adapted to produce movement of the replica stepwise in either direction.

The multiplier array 24 and summing amplifier 25 produce a correlation output consisting of the sum of the multiplied signals occupying connected or correlated pairs of elements of SR1 and SR2. However, the replica occupies progressively more multiplier connected or correlated elements as it is scanned along SR1 in the direction from element 1 to element 851. Referring to Table 1, when occupying elements 1 to 751 for example, the replica occupies 418 correlated elements, and this increases to 477 when elements 101 to 851 are occupied. Since the intervals between correlated elements reduce along SR1 in a geometric progression, and the progressive distortion or contraction of the replica with respect to the waveform is arranged to increase in a like manner, progressively more correlations are performed along the progressively contracting replica. The net effect is that the correlated replica profile is compensated for progressive or non-uniform replica distortion by the non-uniformly spaced multiplier connections, and this profile is uniformly distorted compared to the transmitted waveform. The correlated replica profile is however uniformly distorted to a degree which varies with position in SR1. The apparatus is arranged to produce a uniform contraction when the replica occupies elements 1 to 751, the contraction decreasing with position along SR1 until the replica is centrally located. Similarly the correlated replica is uniformly expanded when occupying elements 101 to 851, the expansion decreasing towards the central position.

The correction display unit 26 is arranged to receive a horizontal time base or line scan signal RL, this being produced by the raster generator 22 from the output of the scanning clock 21 controlling the replica position in SR1. The raster generator 22 also produces a frame scan signal RF. RF is a ramp waveform with superimposed range-Doppler crosstalk correction, the ramp beginning with the transmission of a sonar pulse and continuing for most of the interpulse interval. The raster generator receives a line sync. signal C2 from the control unit 21, the signals C2,RF and RL being shown in FIG. 2.

The scanning clock 21 moves the replica stepwise from one end of SR1 to the other, correlation being performed at each step. The replica is then scanned by the clock 21 in the opposite direction along SR1 after the next electrical signal sample. Scanning the position of the replica along SR1 towards element 851 simulates a sonar waveform varying in Doppler shift from positive (approaching target) through zero when the replica is central to negative (receding target). The output of the summing amplifier 25 is maximum when the waveform of a received sonar pulse is present in the electrical signal stored in SR2, and the replica has reached a point in its scan where the simulated Doppler shift of the replica matches that of the waveform. The intensity of the display unit 26 is arranged to brighten in proportion to the correlation output signal, and reaches a maximum at maximum correlation between the scanning replica and the electrical signal in SR2. The horizontal time base scale is calibrated to give relative target velocity, derived from Doppler shift and replica position. The vertical time base is calibrated in terms of target range, since received pulses or waveforms from more distant targets appear later in SR2. The position of maximum intensity on the display may accordingly be read directly to yield both relative velocity and range of a sonar-detected target.

A minor degree of range-to-Doppler crosstalk is experienced in the apparatus of FIG. 1, since Doppler-contracted signals are correlated earlier as they move along SR2 than occurs for Doppler-expanded signals. This is corrected by slightly modifying the ramp frame scan signal RF as shown in FIG. 2, so that the ramp slope changes when each sample is taken into SR2.

FIGS. 3 and 4 show computer simulations of Doppler scanning correlator outputs, and illustrate correlation for sonar pulses having frequency modulation which is respectively linear "V-chirp" and random or hopping. The latter corresponds to S1 in FIG. 2. Since it is difficult to illustrate intensity variation graphically, in FIGS. 3 and 4 the correlator output has been added to the vertical time base. The peak in either case indicates maximum correlation and hence Doppler shift and the position of the base of either peak indicates target range. The peaks are sharp, greatly facilitating target location and determination of Doppler shift.

Parameters of the apparatus shown in FIG. 1 are as follows. For a sonar system, a probable maximum relative velocity between transmitter and target would be 50 m/sec or 100 knots. This would be positive or negative, ie towards or away from the sonar transmitter. A total Doppler scan in SR1 of 100 elements corresponds to ±50 elements either side of zero Doppler shift. This provides 2% resolution, 1 m/sec or 2 knots. The Doppler shift at a relative velocity of 100 knots is ±6.6%, so the length of the Doppler-shifted waveform in SR2 varies from 93.4% to 106.6% of its unshifted length. The maximum change in correlated profile length over a scan of 100 elements in SR1 is arranged to correspond to this. The correlated profile length as has been mentioned varies from 418 to 477 multiplier-connected elements of SR1, the ratio of 418 to 477 being equal to 93.4/106.6, or about 0.875. The data sampling clock 17 is arranged to sample the electrical signal at a rate which is appropriate to achieve storage of the waveform on between 418 and 477 elements of SR2, according to Doppler shift.

The numbers of elements, the replica scan, and the geometrical progression employed in SR1 and SR2 are chosen as follows. A convenient size for SR2 is chosen as 512 elements, and a suitable geometric progression and corresponding replica scan length are calculated to yield the desired degree of Doppler shift variation. The 512th term of the geometric progression then determines the size of SR1, in this case 851 elements. The maximum and minimum correlated replica sizes, equal to the maximum and minimum Doppler-shifted waveforms which can be correlated, are then determined from the number of correlated elements in SR1 occupied by the replica at either end its scan.

The maximum scanning and sampling rates are dictated by the shortest time a signal may be shifted from one element to the next along SR1 or SR2, and this gives the minimum clock period. For an array of charge-coupled devices, the minimum clock period is 0.1 microseconds. The minimum scan time is the product of the minimum clock period and the number of elements scanned in SR1 together with some allowance for multipliers to settle.

For the linear period clock 18, the ratio of the longest to the shortest replica sampling interval is about 3.51. A small quantisation error occurs since the multiplier-connected or correlated elements of SR1 are spaced in a manner which does not correspond exactly to a geometric progression, but only as nearly as possible for a linear array of discrete elements. The error may be reduced by increasing the number of replica samples taken at the expense of increased scanning time and additional storage requirements—the number of elements in SR1 and SR2.

The quantisation errors could be eliminated by employing as storage devices continuous or stepless delay line, the correlated or multiplier-connected points being spaced alon SR1 exactly in accordance with a geometric progression. In practice however it is found to be convenient to employ linear arrays of discrete elements, and quantisation errors are not serious in the embodiment described.

Figure 5:
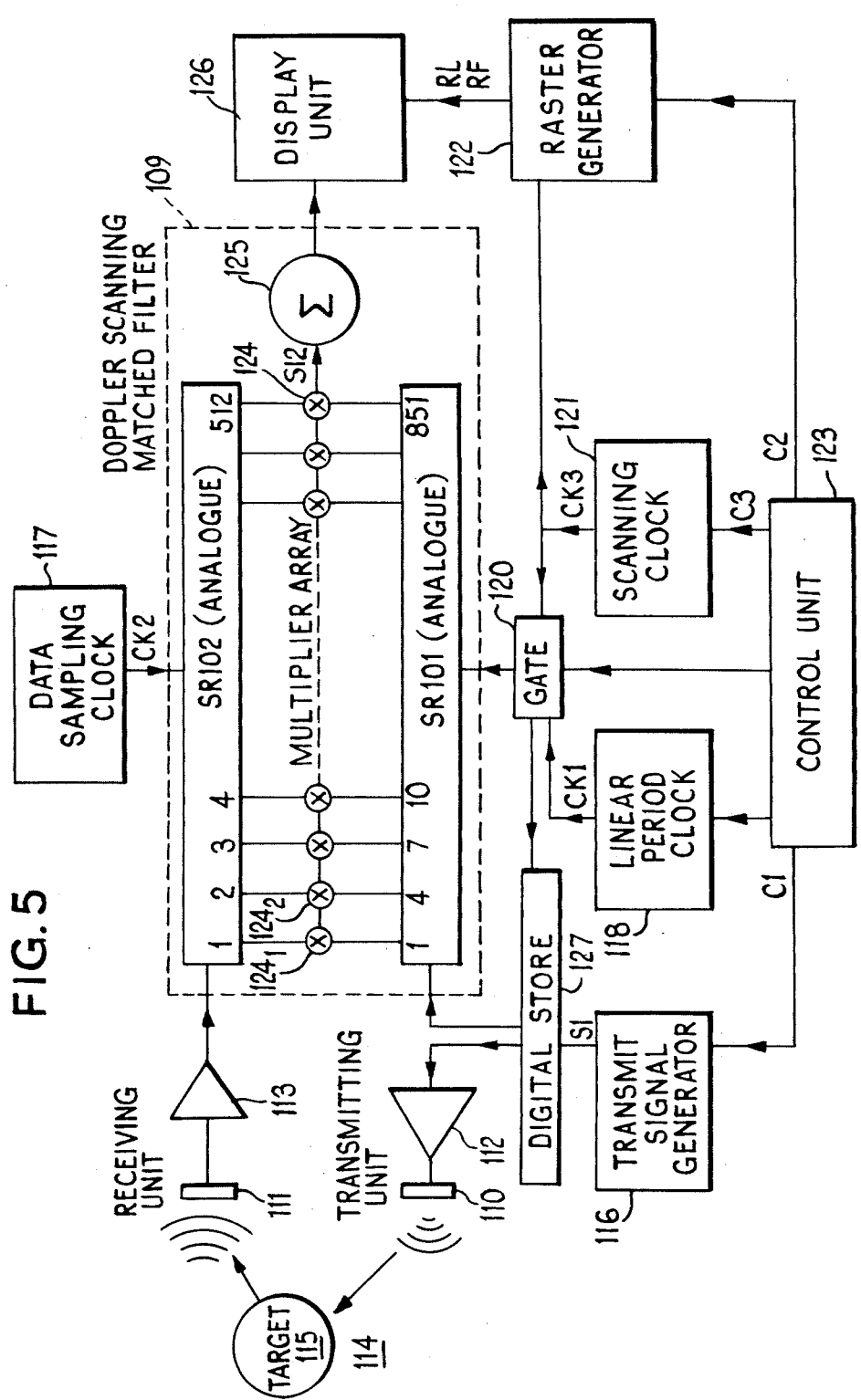

FIG. 5 illustrates a modification to the circuit of FIG. 1 to compensate for charge transfer inefficiency and leakage experienced in charge-coupled devices, which would tend to degrade stored signals. Parts of FIG. 5 corresponding to FIG. 1 are like-numbered but with a prefix of 100. The waveform from the signal generator 16 is sampled at non-uniform intervals into a digital store 127 by the linear period clock 118. If the transmitted signal were computer-generated the store 127 might form an integral part of the signal generator 116. The waveform in the digital store 127 is available both for supplying the sonar output from the transmitter 110 and for periodically refreshing the replica stored in SR101. It is not necessary to employ a digital store in combination with SR102, since the electrical signal in SR102 is periodically refreshed with fresh signal samples by the data sampling clock 117.

The replica stored in SR101 may be refreshed after every Doppler scan from the digital store 127 at the expense of increasing the scan period appreciably.

Since the store 127 is digital, whereas SR101 and the transmitter 110 are analogue, the waveform and replica output signals from the store 127 undergo digital to analogue conversion before being fed respectively to the transmitter 110 and SR101.

Figure 6:
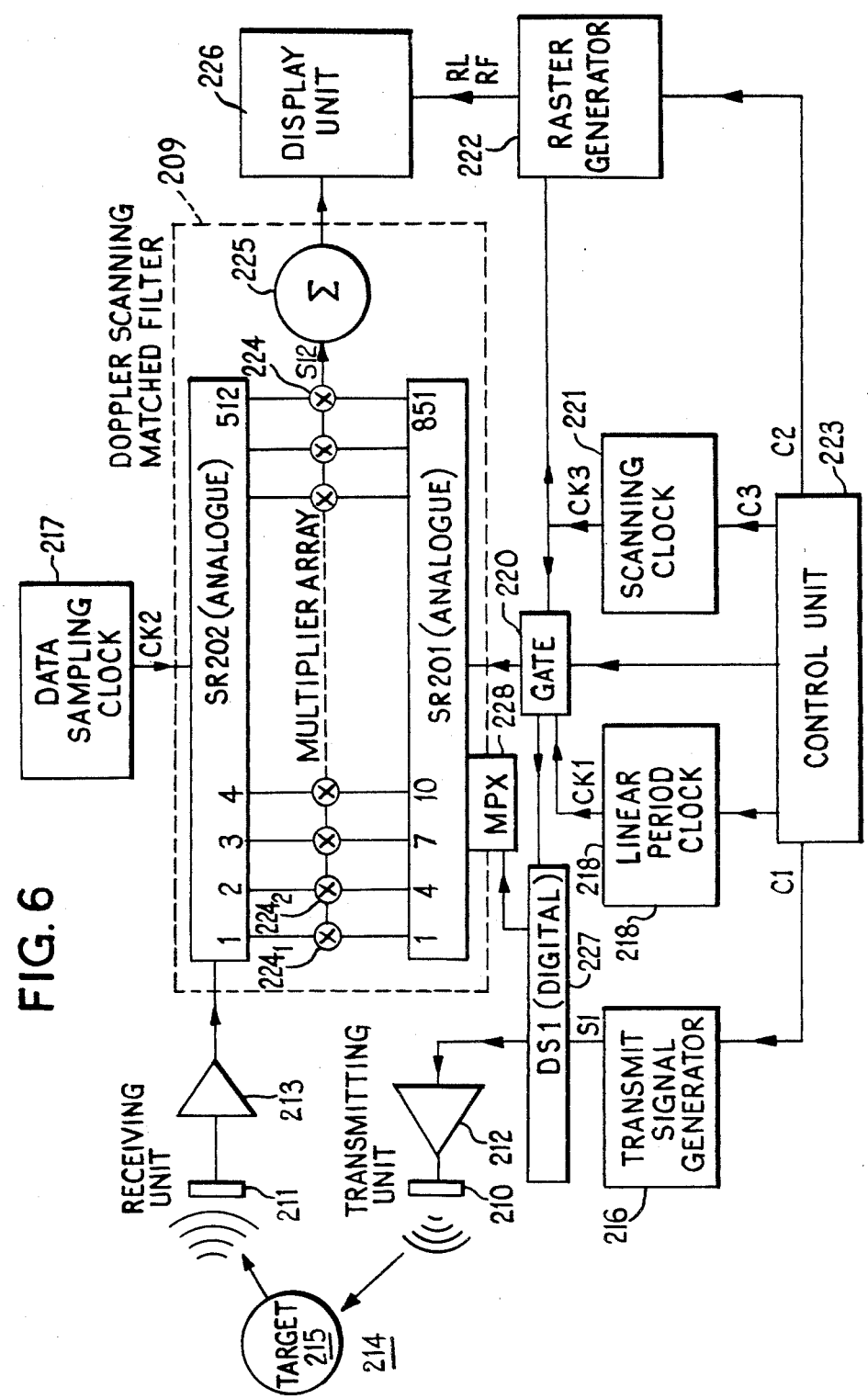

FIG. 6 shows a modification to the arrangement of FIG. 5 in which equivalent parts have like references with a prefix 200. In FIG. 6, a multiplexing device 228 is arranged to allow random access to each element of SR201 to refresh the replica from the waveform stored in the digital store 227. By means of the multiplexer 228, a small number of replica samples in SR201 may be refreshed during each Doppler scan on a rota basis. After a given number of scans the replica may then be wholly refreshed. This allows the total scan time to be reduced as compared to that for the FIG. 5 arrangement.

Figure 7:
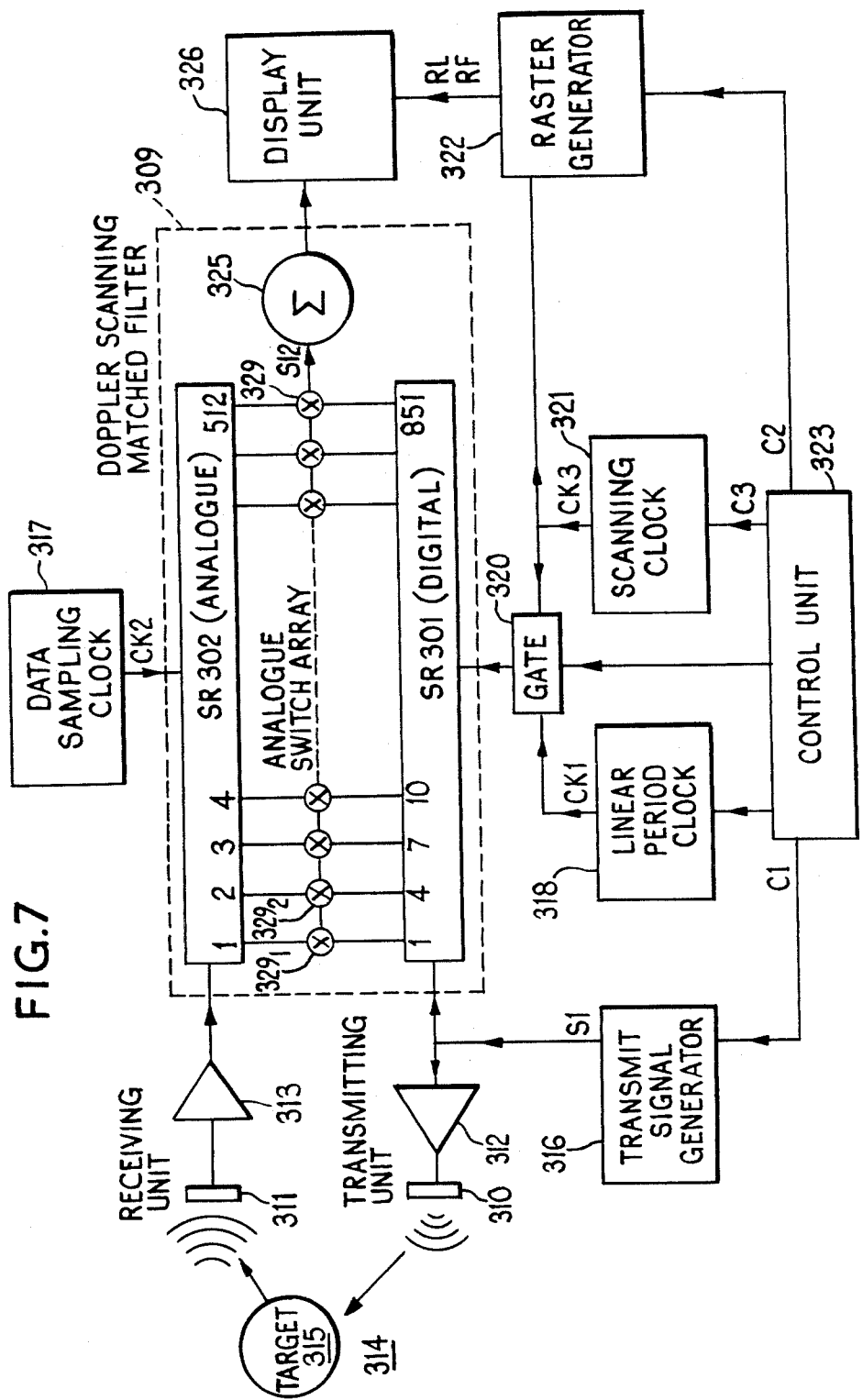

A further embodiment of the invention is illustrated in FIG. 7, in which previously described parts are indicated by like references with the prefix 300. In this embodiment, the storage device SR301 is of digital form, this being particularly economical if the replica is a simple binary or two-state waveform. A multiplier array 329 is provided by a network of analogue switches, since each replica sample stored on a respective element of SR301 corresponds only to an "ON" or "OFF" state. The effect of this is to correlate with the phase information in the waveform, rather than with amplitude and phase information as in the FIGS. 1, 5 and 6 arrangements.

Figure 8:
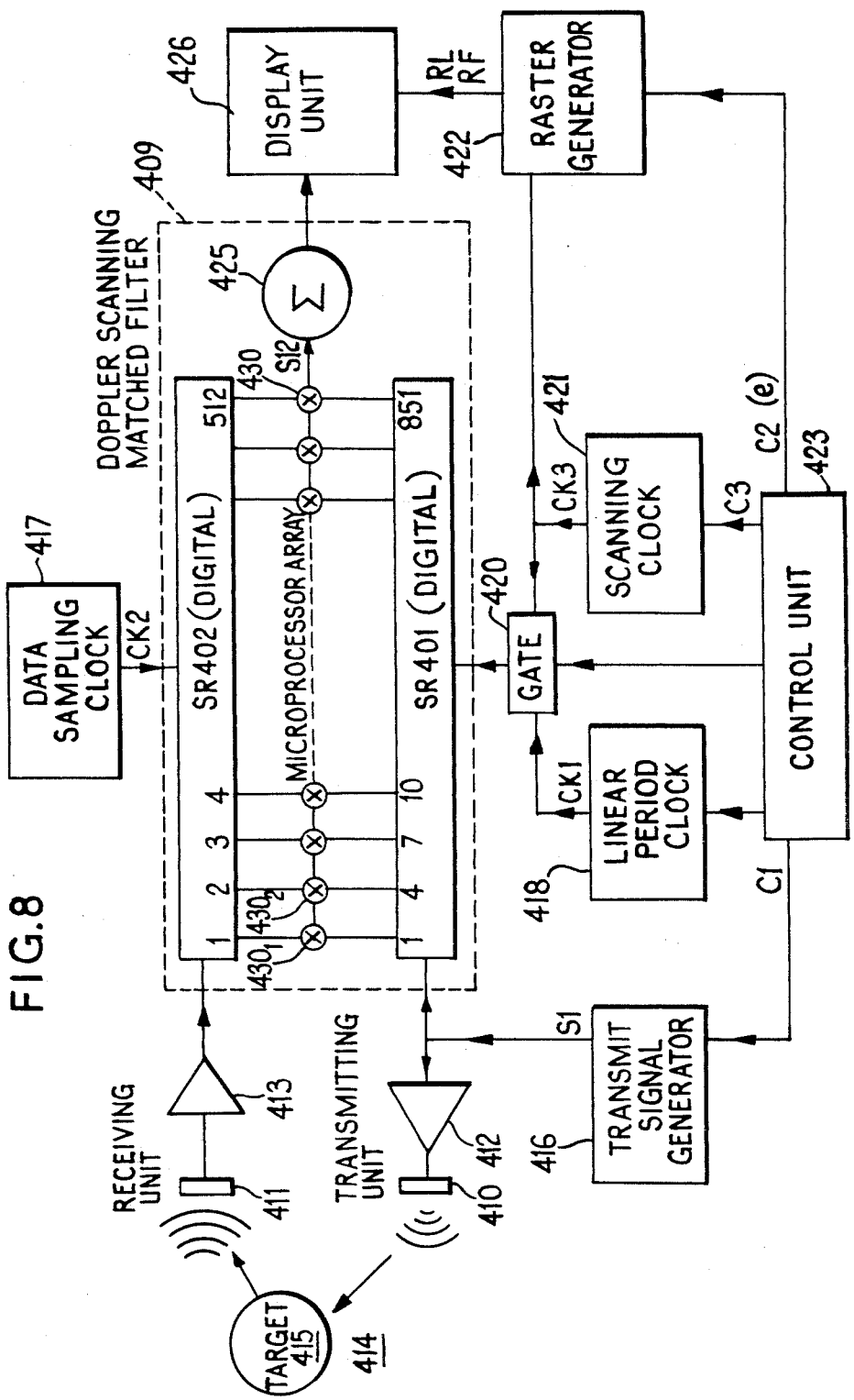

FIG. 8 illustrates a further embodiment of the invention in which previously described parts have like references with the prefix 400. In FIG. 8, the Doppler scanning matched filter 409 comprises digital stores SR401 and SR402 with a microprocessor array 430 for multiplication or correlation purposes. The digital stores SR401 and SR402 are provided by digital shift registers. Further rationalisation may be carried out by integrating SR401, SR402, the multiplexer array 430 and the signal generator 416 to produce an integrated array processor. SR401 may also be used to store a master replica of the sonar waveform. The transmitted acoustic sonar signal may then be generated directly from the stored replica, a separate signal generator being unnecessary. New transmitted signals may be generated by a computer and stored digitally in SR401 prior to transmission. This arrangement also avoids any requirement to refresh the replica, since digital stores do not degrade with time significantly.

Figure 9:
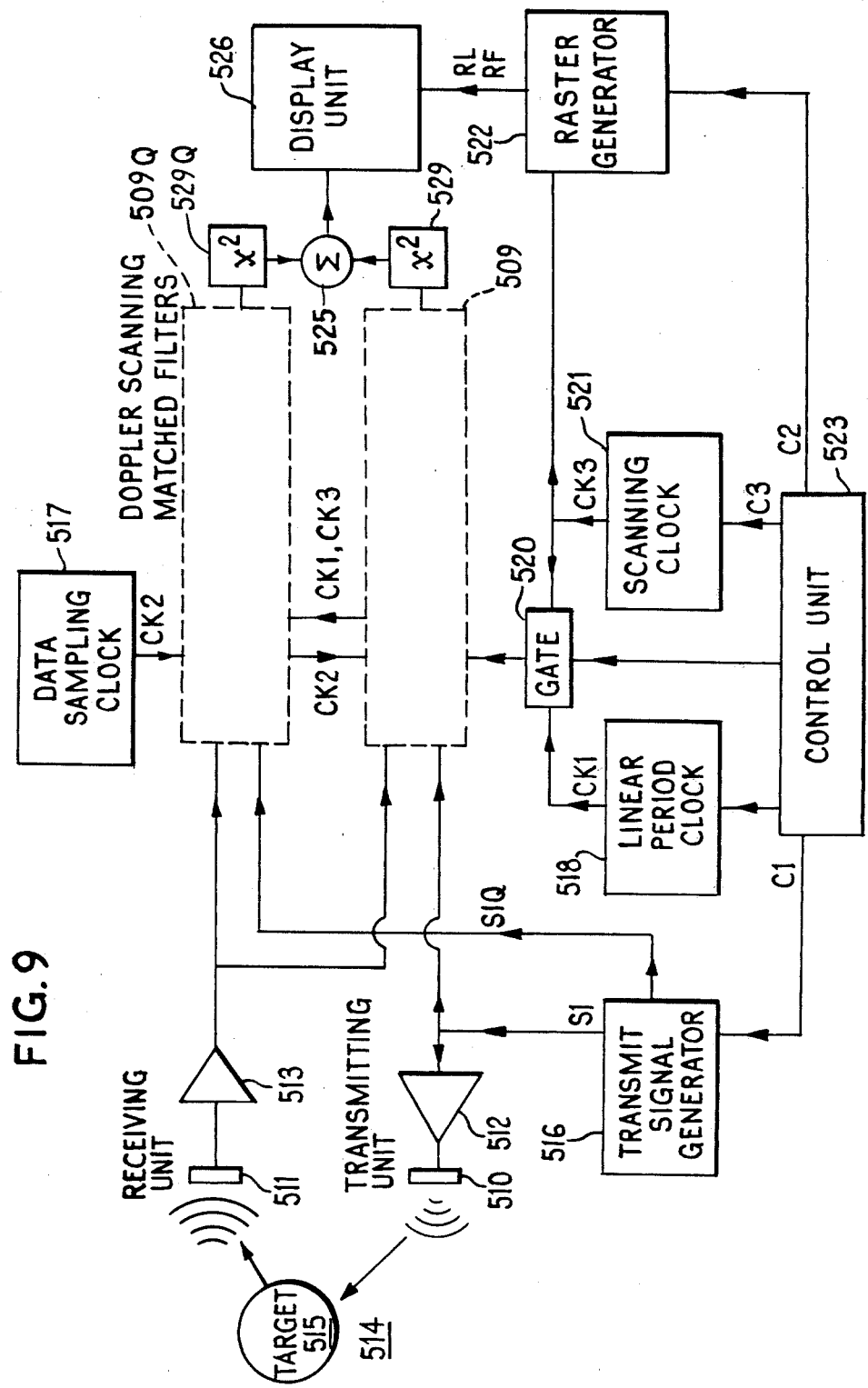

FIG. 9 shows a further embodiment of the invention arranged to compensate for phase shift between the replica and the waveform. Parts corresponding to those previously described have like references with the prefix 500. The circuit of FIG. 9 corresponds to any of the arrangements of FIGS. 1, 5, 6, 7 or 8 but including twin Doppler matched scanning filters 509 and 509Q. In filter 509 the electrical signal from the receiver 511 is correlated with an in-phase replica signal S1, and in filter 509Q correlation is against a quadrature replica signal S1Q. The correlation outputs of the filters 509 and 509Q are squared, and then summed by the amplifier 525 for subsequent display on the unit 526. If the sonar pulse waveform experiences a phase shift $\theta$ before being received by the receiver 511, the correlation outputs of the filters 509 and 509Q will be proportional to $\cos^2 \theta$ and $\sin^2 \theta$ respectively. These outputs accordingly sum to the square of the waveform correlation signal without phase shift.

The FIG. 9 arrangement embodies four storage devices, two for the electrical signal and two for the replica. If necessary both phases of the replica may be correlated against a single stored electrical signal to avoid employing a fourth storage device. It is envisaged however that the storage devices would be laid down in pairs each on a single substrate, in which case it will be convenient to employ two pairs.

TABLE 1

| DOPPLER SCAN SIMULATION DEVICE PARAMETERS | | |
|---|---|---|
| SOUND VELOCITY | 1500.00 | MPS |
| MAX DOPPLER SHIFT | 0.0660 | |
| NO OF DOPPLER LEVELS | 100 | |
| NO OF CORRELATION POINTS | 512 | |
| NO OF EFFECTIVE POINTS | 418 | to 477 |
| NO OF STAGE IN NUTDL(SR1) | 851 | |
| MIN CLOCK PERIOD | 0.00000010 | SEC |
| DATA SAMPLING PERIOD | 0.00001796 | SEC |
| SAMPLING FACTOR | 1 | |
| MIN SCAN TIME | 0.00001010 | SEC |
| WAVEFORM PULSE LENGTH | 0.00800000 | SEC |
| RATIO OF LONGEST TO SHORTEST PERIOD | 3.51 | |
| NORMLZD QUANT TIME ERROR SDEV | 0.1955 | |

NUTAP POSITIONS 1 TO 851
(Correlator-connected points in SR1)

| | | | | | | | |
|---|---|---|---|---|---|---|---|
| 1 | 178 | 322 | 442 | 546 | 638 | 719 | 793 |
| 4 | 180 | 324 | 444 | 548 | 639 | 720 | 794 |
| 7 | 183 | 326 | 446 | 549 | 640 | 722 | 795 |
| 10 | 185 | 328 | 447 | 551 | 642 | 723 | 796 |
| 13 | 188 | 330 | 449 | 552 | 643 | 724 | 797 |
| 16 | 190 | 332 | 451 | 554 | 644 | 725 | 798 |
| 19 | 192 | 334 | 452 | 555 | 646 | 726 | 799 |
| 22 | 195 | 336 | 454 | 557 | 647 | 728 | 800 |
| 25 | 197 | 338 | 456 | 558 | 648 | 729 | 801 |
| 28 | 200 | 340 | 458 | 560 | 650 | 730 | 803 |
| 31 | 202 | 341 | 459 | 561 | 651 | 731 | 804 |
| 34 | 204 | 343 | 461 | 563 | 652 | 732 | 805 |
| 37 | 207 | 345 | 463 | 564 | 653 | 733 | 806 |
| 40 | 209 | 347 | 464 | 565 | 655 | 735 | 807 |
| 43 | 211 | 349 | 466 | 567 | 656 | 736 | 808 |
| 45 | 214 | 351 | 468 | 568 | 657 | 737 | 809 |
| 48 | 216 | 353 | 469 | 570 | 659 | 738 | 810 |
| 51 | 218 | 355 | 471 | 571 | 660 | 739 | 811 |
| 54 | 221 | 357 | 473 | 573 | 661 | 740 | 812 |
| 57 | 223 | 359 | 474 | 574 | 662 | 742 | 813 |
| 60 | 225 | 361 | 476 | 576 | 664 | 743 | 814 |
| 63 | 227 | 363 | 477 | 577 | 665 | 744 | 815 |
| 65 | 230 | 365 | 479 | 578 | 666 | 745 | 816 |
| 68 | 232 | 367 | 481 | 580 | 668 | 746 | 817 |
| 71 | 234 | 368 | 482 | 581 | 669 | 747 | 818 |
| 74 | 237 | 370 | 484 | 583 | 670 | 748 | 819 |
| 77 | 239 | 372 | 486 | 584 | 671 | 750 | 820 |
| 79 | 241 | 374 | 487 | 586 | 673 | 751 | 821 |
| 82 | 243 | 378 | 489 | 587 | 674 | 752 | 822 |
| 85 | 245 | 378 | 490 | 588 | 675 | 753 | 824 |
| 88 | 248 | 380 | 492 | 590 | 676 | 754 | 825 |
| 90 | 250 | 382 | 494 | 591 | 678 | 755 | 826 |
| 93 | 252 | 383 | 495 | 593 | 679 | 756 | 827 |
| 96 | 254 | 385 | 497 | 594 | 680 | 758 | 828 |
| 99 | 257 | 387 | 498 | 595 | 681 | 759 | 829 |
| 101 | 259 | 389 | 500 | 597 | 683 | 760 | 830 |
| 104 | 261 | 391 | 502 | 598 | 684 | 761 | 831 |
| 107 | 263 | 393 | 503 | 600 | 685 | 762 | 832 |
| 109 | 265 | 394 | 505 | 601 | 686 | 763 | 833 |
| 112 | 267 | 396 | 506 | 602 | 688 | 764 | 834 |
| 115 | 270 | 398 | 508 | 604 | 689 | 765 | 835 |
| 117 | 272 | 400 | 509 | 605 | 690 | 767 | 836 |
| 120 | 274 | 402 | 511 | 607 | 691 | 768 | 837 |
| 123 | 276 | 404 | 513 | 608 | 693 | 769 | 838 |
| 125 | 278 | 405 | 514 | 609 | 694 | 770 | 839 |
| 128 | 280 | 407 | 516 | 611 | 695 | 771 | 840 |
| 130 | 282 | 409 | 517 | 612 | 696 | 772 | 841 |
| 133 | 285 | 411 | 519 | 613 | 698 | 773 | 842 |
| 135 | 287 | 413 | 520 | 615 | 699 | 774 | 843 |
| 138 | 289 | 414 | 522 | 616 | 700 | 775 | 844 |
| 141 | 291 | 416 | 523 | 618 | 701 | 776 | 845 |
| 143 | 293 | 418 | 525 | 619 | 702 | 778 | 846 |
| 146 | 295 | 420 | 527 | 620 | 704 | 779 | 847 |
| 148 | 297 | 421 | 528 | 622 | 705 | 780 | 848 |
| 151 | 299 | 423 | 530 | 623 | 706 | 781 | 849 |
| 153 | 301 | 425 | 531 | 624 | 707 | 782 | 850 |
| 156 | 303 | 427 | 533 | 626 | 708 | 783 | 851 |
| 158 | 305 | 428 | 534 | 627 | 710 | 784 | |
| 161 | 307 | 430 | 536 | 628 | 711 | 785 | |
| 163 | 309 | 432 | 537 | 630 | 712 | 786 | |
| 166 | 311 | 434 | 539 | 631 | 713 | 787 | |
| 168 | 314 | 435 | 540 | 632 | 714 | 789 | |
| 171 | 316 | 437 | 542 | 634 | 716 | 790 | |
| 173 | 318 | 439 | 543 | 635 | 717 | 791 | |
| 176 | 320 | 441 | 545 | 636 | 718 | 792 | |

I claim:

1. A method of detecting a Doppler-shifted waveform in an electrical signal including the steps of:
   (a) generating a replica signal derived from the waveform prior to Doppler shift;
   (b) sampling the replica signal at intervals changing in accordance with a first geometric progression;
   (c) storing the replica samples in successive storage positions of a first storage means whereby the profile of the stored replica samples has a progressively increasing distortion along its length compared to the replica signal;
   (d) storing a sample of the electrical signal in a second storage means by sampling means arranged for sampling at uniform sampling intervals;

(e) correlating the samples of the electrical signal at uniformly spaced storage positions in the second storage means with stored samples of the replica signal profile at storage positions in the first storage means selected such that the ratio of the numbers of storage positions between successive correlated samples in said first storage means is substantially a geometrical progression in the same sense as said first geometric progression so as to cancel the progressively increasing distortion of the replica signal profile;

(f) performing a correlation scan by moving the stored replica signal profile through a range of stored positions;

(g) deriving a correlation output signal indicating degree of correlation between the correlated signals during a scan; and (h) repeating steps (d) to (g) to build up and subsequently refresh a uniform stored profile of the electrical signal while performing successive correlation scans.

2. A method according to claim 1 wherein the stored replica signal is wholly or partly refreshed between samples of the electrical signal.

3. A method according to claim 1 wherein correlation is performed against two stored replica signal profiles having a mutual phase difference.

4. A method according to claim 2 or 3 wherein the waveform is that of a sonar pulse.

5. Apparatus for detecting a Doppler-shifted waveform in an electrical signal including:

(a) means for generating a replica signal derived from the waveform prior to Doppler shift;

(b) means for storing samples of the electrical signal comprising a first storage device having a plurality of storage positions and a sampling clock connected to the storage device and arranged for sampling the electrical signal at uniform sampling intervals;

(c) means for storing samples of the replica signal comprises a second storage device having a plurality of storage positions and a sampling clock connected to the second storage device and arranged for sampling the replica signal at intervals changing in accordance with a first geometric progression such that the profile of the stored replica samples has a progressively increasing distortion along its length compared to the replica signal;

(d) scanning means connected to the second storing device for cyclically moving the stored replica signal profile through a range of storage positions; and (e) correlating means including an array of multipliers connected to respective selected storage positions of the first and second storage devices, the connected storage positions being uniformly spaced in the first signal storage device and being spaced in the second replica profile storage device such that the ratio of the numbers of storage positions between successive multiplier connections to said first storage device is substantially a geometric progression in the same sense as said first geometric progression so as to cancel the progressively increasing distortion of the replica signal profile.

6. Apparatus according to claim 5 wherein each storage device comprises an array of discrete series-connected elements providing discrete storage positions, and each sampling clock is operative to move a stored signal one element along the respective array to accommodate each successive signal sample.

7. Apparatus according to claim 6 wherein the elements are charge-coupled devices.

8. Apparatus according to claim 5 wherein the scanning means is arranged to move the replica signal profile through a cycle of storage positions in each interval between successive samples of the electrical signal.

9. Apparatus according to claim 8 wherein the correlating means is arranged to provide an output signal indicating degree of correlation and the apparatus includes a visual display device adapted to display the output signal as a function of storage position of the replica signal profile.

10. Apparatus according to claim 9 wherein the visual display device is calibrated to indicate degree of Doppler shift in terms of replica signal profile storage position at maximum correlation.

11. Apparatus according to claim 10 wherein the visual display device is arranged to indicate time elapsed between generation of the replica signal and detection of maximum correlation.

12. Apparatus according to claim 11 wherein the output intensity of the visual display device varies in accordance with degree of correlation.

13. Apparatus according to claim 12 incorporated in a pulse-echo target location system and wherein the visual display device has a horizontal time base responsive to replace signal profile storage position and a vertical time base responsive to time elapsed from replica generation or pulse emission, the horizontal and vertical time bases being calibrated respectively in terms of range and relative velocity of target.

14. Apparatus according to claim 13 wherein the target location system is a sonar system.

15. Apparatus according to claim 5 in which the replica signal storage device is adapted for storing two replica signal profiles having a 90° phase difference therebetween, the correlating means is arranged to produce respective output signals from each stored replica signal profile and the electrical signal, and there is provided signal processing means arranged to sum the squares of the correlation output signals.

16. Apparatus according to claim 5 including a digital store arranged to store the sampled replica signal prior to storage in the replica profile storage device and to refresh the stored replica signal profile periodically.

17. Apparatus according to claim 16 including a multiplexing device arranged between the digital store and the replica signal profile storage device for selective partial refreshing of the stored replica signal profile.

18. Apparatus according to claim 5 wherein the array of multipliers is an analogue switch network.

19. Apparatus according to claim 5 wherein the multiplier array is an array of microprocessors.

* * * * *